US012753317B2

(12) United States Patent
Loiseau

(10) Patent No.: US 12,753,317 B2
(45) Date of Patent: Oct. 6, 2026

(54) PIGMENTED FREE RADICAL CURABLE INKJET INKS

(71) Applicant: Agfa NV, Mortsel (BE)

(72) Inventor: Marion Loiseau, Mortsel (BE)

(73) Assignee: Agfa NV, Mortsel (BE)

( * ) Notice: Subject to any disclaimer, the term of this patent is extended or adjusted under 35 U.S.C. 154(b) by 5 days.

(21) Appl. No.: 19/112,433

(22) PCT Filed: Jul. 14, 2023

(86) PCT No.: PCT/EP2023/069690
§ 371 (c)(1),
(2) Date: Mar. 17, 2025

(87) PCT Pub. No.: WO2024/061509
PCT Pub. Date: Mar. 28, 2024

(65) Prior Publication Data

US 2026/0085203 A1 Mar. 26, 2026

(30) Foreign Application Priority Data

Sep. 19, 2022 (EP) .................................... 22196377

(51) Int. Cl.
*C09D 11/38* (2014.01)
*C08J 7/04* (2020.01)
(Continued)

(52) U.S. Cl.
CPC ............ *C09D 11/38* (2013.01); *C08J 7/0427* (2020.01); *C09D 11/037* (2013.01);
(Continued)

(58) Field of Classification Search
None
See application file for complete search history.

(56) References Cited

U.S. PATENT DOCUMENTS

| | | | |
|---|---|---|---|
| 2020/0062983 A1 | 2/2020 | Runacre et al. | |
| 2021/0221156 A1 | 7/2021 | Courtet et al. | |

FOREIGN PATENT DOCUMENTS

| | | | |
|---|---|---|---|
| WO | WO 2019/077364 A1 | 4/2019 | |
| WO | WO 2021/099145 A1 | 5/2021 | |
| WO | WO-2022128258 A1 * | 6/2022 | ........... C09D 11/101 |

OTHER PUBLICATIONS

European Patent Office, International Search Report in International Patent Application No. PCT/EP2023/069690, mailed Sep. 21, 2023, 4 pp.

(Continued)

*Primary Examiner* — Michael G Miller
(74) *Attorney, Agent, or Firm* — Leydig, Voit & Mayer, Ltd.

(57) ABSTRACT

A pigmented free radical curable inkjet ink for manufacturing decorated natural leather including a polymerizable composition monofunctional polyfunctional polymerizable compounds fulfilling the following requirements A to E: A) 65.0 to 95.0 wt % of monofunctional polymerizable compounds with the wt % based on the total weight of the polymerizable composition; B) the polymerizable composition includes a monofunctional acrylate; C) 8.0 to 25.0 wt % of N-vinyl methyl oxazolidinone based on the total weight of the UV curable inkjet ink; D) 3.0 to 30.0 wt % of a polyethyleneglycol diacrylate based on the total weight of the UV curable inkjet ink; E) the polyethyleneglycol diacrylate has a molecular weight MW between 350 and 750; and F) the polyfunctional polymerizable compounds contain the polyethyleneglycol diacrylate in an amount of 60 to 100 wt % based on the total weight of the polyfunctional polymerizable compounds.

16 Claims, 1 Drawing Sheet

(51) Int. Cl.
*C09D 11/037* (2014.01)
*C09D 11/101* (2014.01)
*C09D 11/107* (2014.01)
*C09D 11/322* (2014.01)
*C09D 11/40* (2014.01)
*C14C 11/00* (2006.01)

(52) U.S. Cl.
CPC .......... *C09D 11/101* (2013.01); *C09D 11/107* (2013.01); *C09D 11/322* (2013.01); *C09D 11/40* (2013.01); *C14C 11/003* (2013.01); *C08J 2433/14* (2013.01)

(56) References Cited

OTHER PUBLICATIONS

European Patent Office, Written Opinion in International Patent Application No. PCT/EP2023/069690, mailed Sep. 21, 2023, 7 pp.

* cited by examiner

PIGMENTED FREE RADICAL CURABLE INKJET INKS

CROSS-REFERENCE TO RELATED APPLICATIONS

This patent application is the U.S. national stage of copending International Patent Application No. PCT/EP2023/069690, filed Jul. 14, 2023, which claims the benefit of European Patent Application No. 22196377.0, filed Sep. 19, 2022.

TECHNICAL FIELD

The present invention relates to pigmented free radical curable inkjet inks especially suited for manufacturing decorated natural leather and leather articles therewith.

BACKGROUND ART

Natural leather has been traditionally decorated by screen printing. However, screen printing is labour intensive as each colour requires an individual screen. This is costly and time consuming, especially when personalization or customization is desired. Digital printing technologies using UV curable inkjet ink have been disclosed for printing on natural leather. UV curable inkjet inks have the advantage that they can be printed on substantially non-absorbing substrates, including natural leather that after tanning and crusting has been coated with a pigmented layer.

For example, WO 2013/135828 (CODUS) discloses a method of printing into leather comprising the steps of a) applying ink acceptor directly to the surface of the leather; b) applying ink directly onto the acceptor by inkjet; c) applying an additive to the ink; d) heating a surface of a barrier which is substantially impervious to the ink; and e) contacting the heated barrier with the ink acceptor, additive and ink on the leather surface directly to soften the additive, ink acceptor and ink into the leather such that the ink penetrates into the leather.

The leather inkjet printed with a decorative image is stapled during manufacturing. It was observed that the decorative image was often damaged during stapling as the UV curable inkjet ink contained very high amounts of monofunctional polymerizable compounds for flexibility and exhibited some stickiness towards the leather deposited on the decorative image.

One option would be to increase the amount of polyfunctional polymerizable compounds. However, this decreases the flexibility of the printed leather, generally resulting in cracks visible in the decorative image.

Another option would be to not staple the freshly printed leather or to deposit anything on the decorative image. However, this would lead to a strong increase in the required storage room which is financially disadvantageous.

Hence, there remains a need for pigmented free radical curable inkjet inks having an improved flexibility and stickiness so that printed substrates can be stapled on a limited floor space without visible damage to the decorative image printed on the substrate.

SUMMARY OF INVENTION

In order to overcome the problems described above, preferred embodiments of the present invention have been realised with a pigmented free radical curable inkjet ink as in claim 1.

It was surprisingly found that an inkjet printed leather exhibiting excellent flexibility and stickiness could be obtained by using a specific combination of polymerizable compounds.

These and other objects of the present invention will become apparent from the detailed description hereinafter.

DESCRIPTION OF EMBODIMENTS

Definitions

Figure 1:
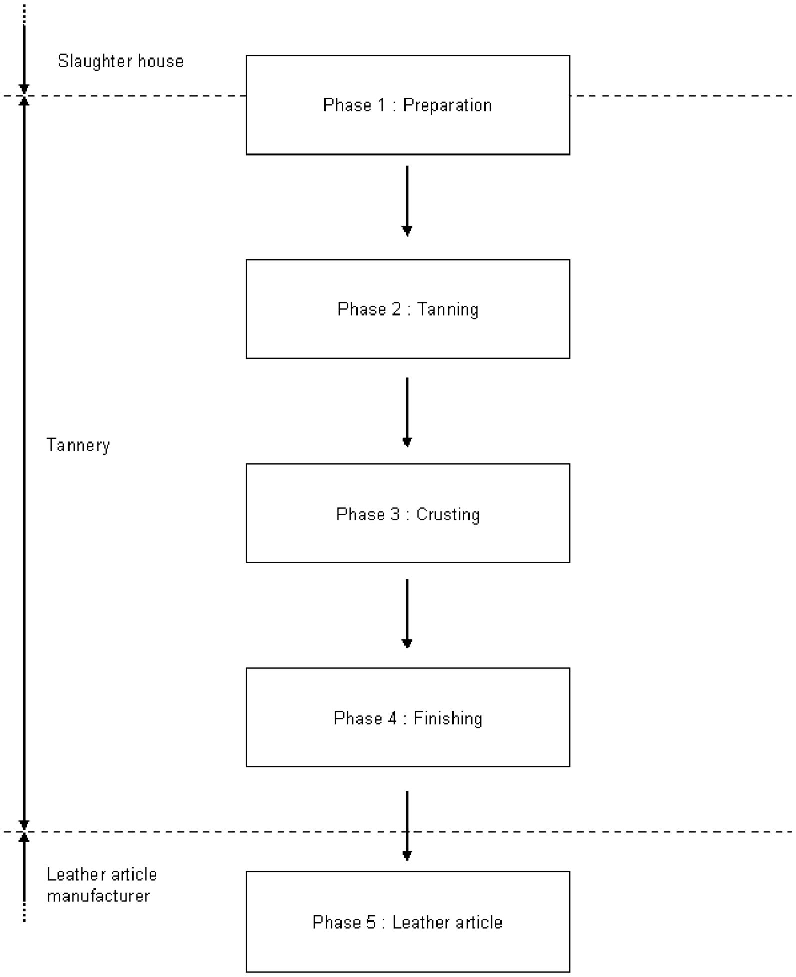
FIG. 1 shows a flow chart of the traditional manufacturing of leather articles involving the different phases and locations.

The term "crusted leather" or "crust leather" means leather that has been tanned and crusted, but not finished.

The term "monofunctional" as used in monofunctional polymerizable compounds means compounds containing a single polymerizable group.

The term "polyfunctional" as used in polyfunctional polymerizable compounds means compounds containing two, three or more polymerizable groups.

Pigmented Free Radical Curable Inkjet Inks

A pigmented free radical curable inkjet ink for manufacturing decorated natural leather according to a preferred embodiment of the present invention includes a polymerizable composition monofunctional polyfunctional polymerizable compounds fulfilling the following requirements A to E: A) 65.0 to 95.0 wt % of monofunctional polymerizable compounds with the wt % based on the total weight of the polymerizable composition; B) the polymerizable composition includes a monofunctional acrylate; C) 8.0 to 25.0 wt % of a N-vinyl oxazolidinone according to the Formula 1 based on the total weight of the UV curable inkjet ink, wherein the N-vinyl oxazolidinone according to the Formula 1 is:

Formula 1

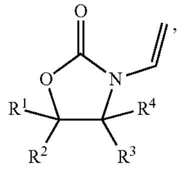

wherein $R^1$ to $R^4$ are not limited other than by the constraints imposed by the use in an ink-jet ink, such as viscosity and ink stability. Preferred substituents for $R^1$ to $R^4$ include hydrogen, alkyl, cycloalkyl, aryl and combinations thereof, any of which may be interrupted by heteroatoms; D) 3.0 to 30.0 wt % of a polyethyleneglycol diacrylate based on the total weight of the UV curable inkjet ink; E) the polyethyleneglycol diacrylate has a molecular weight MW between 350 and 750; and F) the polyfunctional polymerizable compounds contain the polyethyleneglycol diacrylate in an amount of 60 to 100 wt % based on the total weight of the polyfunctional polymerizable compounds.

In a preferred embodiment of the pigmented free radical curable inkjet ink, the N-vinyl oxazolidinone according to the Formula 1 is N-vinyl-5-methyl2-oxazolidinone.

In a preferred embodiment of the pigmented free radical curable inkjet ink, the polymerizable composition has a double bond density DBD in the range of 5.12 to 5.60 mmol double bonds/g, wherein the double bond density DBD is calculated by the formula:

$$DBD = \frac{\sum_{i=1\ to\ n}^{n} \frac{F(i) \times \text{wt \% } (i)}{MW(i)}}{\sum_{i=1\ to\ n}^{n} \text{wt \% } (i)},$$

wherein i represents an integer of 1 to n;

n represents the number of polymerizable compounds in the UV free radical curable inkjet ink;

F(i) represents the functionality of polymerizable compound i;

MW(i) represents the molecular weight of polymerizable compound i; and wt % (i) is the weight percentage of polymerizable compound i based on the total weight of the pigmented free radical curable inkjet ink. By selecting a double bond density DBD in the above range, an ink viscosity can be obtained that has superior printing reliability.

The polyethyleneglycol diacrylate has a molecular weight MW between 350 and 750. In a preferred embodiment of the pigmented free radical curable inkjet ink, the polyethyleneglycol diacrylate has a molecular weight MW between 400 and 600. Below a MW of 400 the flexibility tends to deteriorate somewhat, while above a MW of 600 the stickiness tends to deteriorate somewhat.

In a preferred embodiment of the pigmented free radical curable inkjet ink, the polyfunctional polymerizable compounds consist of difunctional polymerizable compounds. A higher functionality than 2 of the polyfunctional polymerizable compounds is beneficial for stickiness, but rapidly decreases the flexibility.

In a preferred embodiment of the pigmented free radical curable inkjet ink, the monofunctional acrylate includes 20.0 wt % to 33.0 wt % of an aromatic acrylate based on the total weight of the pigmented free radical curable inkjet ink. It has been observed that this is beneficial for stickiness.

In a preferred embodiment of the pigmented free radical curable inkjet ink, the pigmented free radical curable inkjet ink contains 70.0 to 93.0 wt % of monofunctional polymerizable compounds with the wt % based on the total weight of the polymerizable composition. It has been observed that this is beneficial for stickiness.

In a preferred embodiment of the pigmented free radical curable inkjet ink, the polyfunctional polymerizable compounds contain the polyethyleneglycol diacrylate in an amount of 65 to 100 wt % based on the total weight of the polyfunctional polymerizable compounds. In such a range, a better result is obtained for stickiness and flexibility. It is assumed that a higher amount of smaller molecular weight polyfunctional polymerizable compounds results in more crosslinking and thus a poorer flexibility. On the other hand, higher molecular weight polyfunctional polymerizable compounds result in less crosslinking and thus a poorer stickiness.

In a preferred embodiment of the pigmented free radical curable inkjet ink, the inkjet ink has a calculated glass transition temperature Ink Tg of not more than 18° C., preferably no more than 13° C. The ink Tg can be calculated according to Formula (I):

$$InkTg = \frac{\sum_{i=1\ to\ n}^{n} \text{wt \% } PC(i)}{\sum_{i=1}^{n} \frac{\text{wt \% } PC(i)}{273.15 + TgPC(i)}} - 273.15, \quad \text{Formula (I)}$$

wherein i and n are integers; n is the total number of polymerizable compounds in the free radical curable inkjet ink; TgPC(i) is the glass transition temperature in degrees Celsius of the polymerizable compound PC(i); and wt % PC(i) is the weight percentage of the polymerizable compound PC(i); and wherein all the weight percentages are based on the total weight of the free radical curable inkjet ink.

The glass transition temperatures, TgPC(i), used in the above equation are those of the homopolymer of the polymerizable compound. For a number of compounds, the TgPC (i) is found in Table 1 in paragraph 112 of WO 2020/030668 (AGFA). If the polymerizable compound is not listed there, the TgPC(i) for a polymerizable compound can usually be found in the manufacturers' datasheet. If unavailable, the TgPC(i) of a certain polymerizable compound can be determined by the DSC method as explained in ISO 11357-2: 1999.

There is no limitation to combine the above preferred embodiments of the pigmented free radical curable inkjet ink.

Free Radical Curable Inkjet Ink sets

The pigmented free radical curable inkjet ink is preferably part of a free radical curable inkjet ink set. This allows for printing multi-colour images.

In a preferred embodiment, the free radical curable inkjet ink set includes at least three or four pigmented free radical curable inkjet inks as described above. This allows to form a CMY or a CMYK ink set for obtaining excellent flexibility and stickiness of multi-colour images printed on flexible substrates.

In a particularly preferred embodiment, the free radical curable inkjet ink set includes: a) a cyan pigmented free radical curable inkjet ink containing a beta-copper phthalocyanine pigment; b) a magenta or red pigmented free radical curable inkjet ink containing a quinacridone pigment, a diketopyrrolopyrrole pigment or mixed crystals thereof; c) a yellow pigmented free radical curable inkjet ink containing a yellow pigment selected from the group consisting of C.I. Pigment Yellow 83, C.I. Pigment Yellow 93, C.I. Pigment Yellow 97, C.I. Pigment Yellow 110, C.I. Pigment Yellow 120, C.I. Pigment Yellow 138, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 185, C.I. Pigment Yellow 194, C.I. Pigment Yellow 213, C.I. Pigment Yellow 214 and mixed crystals thereof; and d) a black pigmented free radical curable inkjet ink containing a carbon black pigment. By using these specific inks, excellent light stability was obtained.

In a particularly preferred embodiment of the ink set, the cyan, black, magenta or red, and yellow free radical curable inkjet inks all have an ink composition as described above.

The inkjet ink set is preferably a free radical curable CMYK or CRYK inkjet ink set. Such inkjet an ink set provides for a very large colour gamut.

This free radical curable inkjet ink set may also be extended with extra inks such as red, green, blue, and/or orange to further enlarge the colour gamut of the image.

The free radical curable inkjet ink set may also be extended by the combination of full density inkjet inks with light density inkjet inks. The combination of dark and light colour inks and/or black and grey inks improves the image quality by a lowered graininess.

The inkjet ink set may also include a colourless free radical curable inkjet ink, such as a varnish. A varnish is used to enhance the glossiness of inkjet printed colour images.

The inkjet ink set may also include a white free radical curable inkjet ink. The white free radical curable inkjet ink preferably contains a titanium dioxide pigment, preferably a rutile pigment, having an average particle size larger than 180 nm, preferably between 200 and 280 nm, more preferably between 220 and 250 nm. Such a white ink layer can be positioned between the substrate and the colour image to make the colour more vibrant.

A white free radical curable inkjet ink preferably includes a pigment with a high refractive index, preferably a refractive index greater than 1.60, preferably greater than 2.00, more preferably greater than 2.50 and most preferably greater than 2.60. Such white pigments generally have a very high covering power, i.e. a limited amount of white ink is necessary to hide the colour of the substrate. The most preferred white pigment is titanium dioxide.

The white free radical curable inkjet ink preferably contains the white pigment in an amount of 10 wt % to 25 wt %, more preferably 12 to 20 wt % of white pigment based upon the total weight of the white inkjet ink.

The average particle diameter of the white pigment is preferably from 150 to 500 nm, and most preferably from 180 to 300 nm. Sufficient hiding power cannot be obtained when the average diameter is less than 150 nm, and the storage ability and the jet-out suitability of the ink tend to be degraded when the average diameter exceeds 500 nm.

Polymerizable Compounds

Any polymerizable compound commonly known in the art may be employed as long as the polymerizable composition as described above is complied with. The polymerizable compound may be any monomer or oligomer found in the Polymer Handbook Vol 1+2, 4th edition, edited by J. BRANDRUP et al., Wiley-Interscience, 1999. An oligomer in the present invention is understood to contain 2 or more repeating monomeric units.

A combination of monomers and oligomers may also be used. The monomers and oligomers may possess different degrees of functionality, and a mixture including combinations of mono-, di-, tri- and higher functionality monomers and oligomers may be used.

Monofunctional Polymerizable Compounds

An essential feature of the invention is a combination of a monofunctional acrylate with a specific N-vinyl oxazolidinone according to the Formula 1:

Formula 1

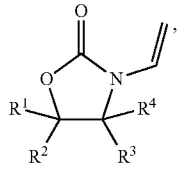

wherein $R^1$ to $R^4$ are not limited other than by the constraints imposed by the use in an ink-jet ink, such as viscosity and ink stability. Preferred substituents for $R^1$ to $R^4$ include hydrogen, alkyl, cycloalkyl, aryl and combinations thereof, any of which may be interrupted by heteroatoms.

Most preferably $R^1$ to $R^4$ are independently selected from hydrogen or a $C_1$ to $C_{10}$ alkyl.

Preferred compounds are disclosed in WO 2015/022228 (BASF) and U.S. Pat. No. 4,831,153 (DOW CHEMICAL)

In a particular preferred embodiment, the N-vinyl oxazolidinone according to the Formula 1 is N-vinyl-5-methyl-2-oxazolidinone There is no real limitation of the type of monofunctional acrylate. A combination of monofunctional acrylates is preferably used to further optimize other properties of the pigmented free radical curable inkjet ink. However, it was observed that improved results could be obtained for stickiness if an aromatic monofunctional acrylate was used in a certain range.

In a preferred embodiment of the pigmented free radical curable inkjet ink, the monofunctional acrylate includes 20.0 wt % to 33.0 wt % of aromatic acrylate based on the total weight of the pigmented free radical curable inkjet ink. A particularly preferred aromatic monofunctional acrylate is phenoxyethyl acrylate.

Other preferred aromatic acrylates include benzyl acrylate, 2-hydroxy-3-phenoxypropylacrylate, phenoxypolyethyleneglycol acrylate, ethoxylated (4) nonylphenol acrylate and ethoxylated (4) phenol acrylate.

Non-aromatic cyclic monofunctional acrylates include heterocyclic monofunctional acrylates and alicyclic monofunctional acrylates.

Preferred heterocyclic acrylates contains a ring structure wherein the one or more heteroatoms are preferably an oxygen atom.

Preferred heterocyclic acrylates include tetrahydrofurfuryl acrylate, caprolacton-modified-tetrahydrofurfurylacrylate, cyclic trimethylolpropane formal acrylate, (2-ethyl-2-methyl-1,3-dioxolan-4-yl)methyl acrylate, (2.2-dimethyl-1, 3-dioxolan-4-yl)methyl acrylate cyclohexanespriro-2-(1,3-dioxolane-4-yl))methyl acrylate and (3-ethyloxetane-3-yl) methyl acrylate.

An alicyclic acrylate contains one or more all-carbon rings which may be either saturated or unsaturated, but do not have aromatic character.

Preferred alicyclic acrylates include 3,3,5-trimethylcyclohexyl acrylate, isobornyl acrylate, 4-tert.butylcyclohexylacrylate, dicyclopentenylacrylate; and dicyclopentenyloxyethylacrylate cyclohexyl acrylate, 1,4-cyclohexanedimethanolmonoacrylate and 2-propenoic acid, (octahydro-4,7-methano-1H-inden-1-yl)methyl ester.

Other preferred monofunctional polymerizable compounds include di-ethyleneglycolbutyletheracrylate, 2-ethyl hexyl acrylate, ethoxydiethyleneglycolacrylate, di(ethylene glycol) 2-ethylhexyl ether acrylate, octyl-decylacrylate, n-octylacrylate, isodecyl acrylate, isononyl acrylate, methoxypolyethyleneglycol (350) monoacrylate, tridecyl acrylate, 2(2-ethoxyethoxy) ethyl acrylate, isooctyl acrylate, butylacrylate, and polycaprolactone acrylate, methoxy polyethylene glycol (550) monoacrylate, 2-methoxyethyl acrylate, ethoxylated (4) lauryl acrylate, iso-amylacrylate, methoxy-triethyleneglycolacrylate, ethoxylated (8) nonylphenolacrylate, 4-hydroxy butyl acrylate, lauryl acrylate, ethylacrylate, 1H,1H,5H-octafluoropentylacrylate, 2-hydroxypropyl acrylate, 2-propylheptylacrylate, isostearylacrylate, hydroxyethyl acrylate, 2,2,2-trifluoroethylacrylate, stearylacrylate, 2-hydroxybutylacrylate, 2-ethylhexyldiglycolacrylate, tertiarybutylacrylate, carboxyethyl acrylate, 2-((butylcarbamoyl)oxy)ethyl acrylate and 2-hydroxy 3-(prop-enoyloxy)propyl 2-methyl-2-propylhexanoate.

Polyfunctional Polymerizable Compounds

The term "polyfunctional polymerizable compound" means a monomer or oligomer having two, three or more polymerizable groups, e.g. two acrylate groups and one vinyl ether group. Such a polymerizable compound can be a monomer or an oligomer.

However, preferably the polyfunctional polymerizable compound contains only polymerizable compounds with two polymerizable groups, preferably two acrylate groups.

For achieving good stickiness and flexibility, an essential polyfunctional polymerizable compound in the inkjet ink is a polyethyleneglycol diacrylate has a molecular weight MW between 350 and 750. Such a compound should be present in the pigmented free radical curable inkjet ink in an amount of 3.0 to 30.0 wt % based on the total weight of the free radical curable inkjet ink. Furthermore, the polyfunctional polymerizable compounds should contain this polyethyleneglycol diacrylate in an amount of 60 to 100 wt %, more preferably 85 to 100 wt %, and most preferably the polyfunctional polymerizable compound consists of the polyethyleneglycol diacrylate has a molecular weight MW between 350 and 750, more preferably between a molecular weight MW between 400 and 600. A commercial example of such a polyethyleneglycol diacrylate is Sartomer™ SR344 from ARKEMA.

Photoinitiators

The pigmented free radical curable inkjet ink preferably includes one or more photoinitiators, which consist preferably of a Norrish type I initiator or a Norrish type II initiator. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or a co-initiator.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Norrish Type I Photoinitiators

The Norrish Type I photoinitiator is preferably selected from the group consisting of benzoinethers, benzil ketals, α-haloketones, α, α-dialkoxyaceto phenones, α-hydroxyalkylphenones, α-halosulfones, α-aminoalkylphenones, acylphosphine oxides, acylphosphine sulphides and phenylglyoxalates.

For high curing speed with UV LEDs emitting in the range of 360-420 nm, the photoinitiator preferably includes an acylphosphine oxide photoinitiator and/or an α-hydroxy ketone photoinitiator, most preferably at least an acylphosphine oxide photoinitiator.

The pigmented free radical curable inkjet ink in accordance with the invention can be advantageously used in combination with UV LEDs emitting in the range of 360-420 nm in order to reduce the stickiness. The reason is that UV LEDs emitting in the range of 360-420 nm generally cure the interior of an ink layer much better than the surface of the ink layer, thus causing the ink layer to be sticky.

In a preferred embodiment of the pigmented free radical curable inkjet ink, the photoinitiator includes ethyl phenyl (2,4,6-trimethylbenzoyl)phosphinate, known as TPO-L. TPO-L is a liquid photoinitiator and thus creates no solubility problems in the pigmented free radical curable inkjet ink contrary to, for instance, bis(2,4,6-trimethylbenzoyl)-phenyl phosphine oxide.

The free radical curable inkjet ink contains the acylphosphine oxide photoinitiator preferably present in an amount of at least 3.0 wt %, more preferably in an amount of 4.0 to 16.0 wt % based on the total weight of the free radical curable inkjet ink.

Suitable examples of the acylphosphine oxide photoinitiators include bis(2,4,6-trimethylbenzoyl)-phenyl phosphine oxide, 2,4,6-trimethylbenzoyl diphenyl phosphine oxide, and ethyl (2,4,6-trimethylbenzoyl) phenyl phosphinate, bis-(2,6-dimethoxybenzoyl) 2,4,4-trimethylpentyl phosphine oxide. Such acylphosphine oxide photoinitiators are commercially available, for example, as Omnirad™ 819, Omnirad™ TPO and Omnirad™ TPO-L from IGM Resins.

The acylphosphine oxide may also be a polymeric compound, such as Omnipol™ TP from IGM Resins.

The acylphosphine oxide photoinitiator may include an acyl group containing a polymerizable group or an acyl group selected from the group consisting of a benzoyl group substituted by an urea group or an oxalylamide group; a 2,6-dimethyl benzoyl group substituted in position 3 by an urea group or an oxalylamide group; a 2,6-dimethoxy benzoyl group substituted in position 3 by an urea group or an oxalylamide group; a 2,4,6-trimethyl benzoyl group substituted in position 3 by an urea group or an oxalylamide group; and a 2,4,6-trimethoxybenzoyl group substituted in position 3 by an urea group or an oxalylamide group. By using such an acylphosphine oxide photoinitiator, no mesitaldehyde is released after UV curing, which causes a bad odor of the printed article.

Suitable acylphosphine oxide photoinitiators having an acyl group substituted by an urea group or an oxalylamide group are disclosed in WO 2019/243039 (AGFA).

Suitable acylphosphine oxide photoinitiators including an acyl group containing a polymerizable group are disclosed by WO 2014/051026 (FUJIFILM).

A combination of different acylphosphine oxide photoinitiators may also be used. For example, a combination of monofunctional acylphosphine oxide photoinitiators, such as TPO and TPO-L, and multifunctional acylphosphine oxide photoinitiators, such as bis(2,4,6-trimethylbenzoyl)-phenyl phosphine oxide. Preferably such a combination contains more monofunctional acylphosphine oxide photoinitiator than multifunctional acylphosphine oxide photoinitiator. A combination containing at least 70 wt % of monofunctional acylphosphine oxide photoinitiator, preferably TPO-L, generally exhibits a higher curing efficiency.

Alternatively, the acylphosphine oxide is a polymeric compound wherein the acylphosphine oxide structure is bonded to a polymeric chain on an acyl group side thereof. Suitable compounds are disclosed in WO 2014/129213 (FUJIFILM). By having the acyl group bonded to the polymeric chain, the odor of the printed article is also suppressed.

Suitable examples of the α-hydroxy ketone photoinitiators include, but are not particularly limited to, 1-hydroxy-cyclohexyl phenyl ketone, 2-hydroxy-2-methyl-1-phenyl propane-1-one and 1-[4-(2-hydroxyethoxy)-phenyl]2-hydroxy-2-methyl-1-propane-1-on.

Examples of commercially α-hydroxy ketone photoinitiators include, but are not particularly limited to, Omnirad™ 1173, Omnirad™ 184 and Omnirad™ 127 and Omnirad™ 4817 from IGM RESINS.

The content of the α-hydroxy ketone is preferably 1 to 10 wt %, more preferably 2 to 8 wt %, and still more preferably 3 to 6 wt % based on the total weight of the UV LED free radical curable inkjet ink.

In a particularly preferred embodiment, the α-hydroxy ketone photoinitiator is a polymeric or a polymerizable photoinitiator.

An example of a suitable polymeric α-hydroxy ketone photoinitiator is available as Esacure™ KIP150 from IGM RESINS.

Suitable polymerizable α-hydroxy ketone photoinitiators are disclosed in U.S. Pat. No. 4,922,004 (MERCK), such as 4-(2-acryloyloxyethoxy)-phenyl 2-acryloyloxy-2-propyl ketone prepared in Example 3.

Norrish Type II Photoinitiators

The UV LED free radical curable inkjet ink may contain a Norrish Type II photoinitiator including a photoinitiating moiety selected from the group consisting of a thioxanthone group, a carbazole group and a benzophenone group. A Norrish Type II photoinitiator containing a thioxanthone group or a carbazole group is particularly preferred as it is advantageous for UV LED curing, especially for UV LEDs having an emission wavelength of 370 nm or more.

Suitable examples of Norrish Type II photoinitiators containing a thioxanthone group include, but are not particularly limited to, thioxanthone; diethylthioxanthone, such as 2,4-diethylthioxanthone; isopropylthioxanthone, such as 2-isopropylthioxanthone and 4-isopropylthioxanthone; and chlorothioxanthone, such as 2-chlorothioxanthone.

Specific examples of commercially available Norrish Type II photoinitiators containing a thioxanthone group are Speedcure™ DETX (2,4-diethylthioxanthone) and Speedcure™ ITX (2-isopropylthioxanthone) from LAMBSON and Kayacure™ DETX-S(2,4-diethylthioxanthone) from Nippon Kayaku Co.

Preferred carbazole photoinitiators are disclosed by EP 2509948 A (AGFA) These carbazole photoinitiators have the advantage over thioxanthone photoinitiators of exhibiting less photoyellowing.

Suitable examples of Norrish Type II photoinitiators containing a benzophenone group include, but are not particularly limited to, benzophenone; methylbenzophenone; methyl-2-benzoylbenzoate, phenylbenzophenone, such as 4-phenylbenzophenone; trimethylbenzophenone; bis(alkylamino)benzophenone; and 4-(dialkylamino)benzophenone.

Specific examples of commercially available Norrish Type II photoinitiators containing a benzophenone group are Omnirad™ 4MBZ and Omnirad™ BP from IGM RESINS, Speedcure™ PBZ and Speedcure™ 5040 from LAMBSON. The latter is a mixture of benzophenone and thioxanthone.

Preferred examples of polymerizable Norrish Type II photoinitiators including a photoinitiating moiety selected from the group consisting of a thioxanthone group or a benzophenone group are disclosed in EP 2161264 A (AGFA), EP 2199273 A (AGFA) and EP 2684876 A (AGFA).

Preferred examples of polymeric Norrish Type II photoinitiators including a photoinitiating moiety selected from the group consisting of a thioxanthone group or a benzophenone group are disclosed in EP 1616920 A (AGFA) and EP 1616899 A (AGFA).

Commercial examples of polymeric thioxanthones and benzophenones include Omnipol™ BP, Omnipol™ TX, and Omnipol™ 2702 from IGM RESINS.

The content of the Norrish Type II photoinitiator including a photoinitiating moiety selected from the group consisting of a thioxanthone group, a carbazole group and a benzophenone group is preferably 0.5 to 7.5 wt %, more preferably 1 to 5 wt % based on the total weight of the free radical curable inkjet ink. However, if the Norrish Type II photoinitiator is a polymerizable or a polymeric thioxanthone or carbazole compound, the content may be higher, preferably up to 25 wt %, more preferably up to 15 wt % based on the total weight of the free radical curable inkjet ink.

Polymerization Synergists

In order to increase the photosensitivity further, the free radical curable inkjet ink may additionally contain one or more co-initiators, also called polymerization synergists, for which usually amine synergists are used.

Suitable examples of amine synergists can be categorized in three groups:

1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino) benzoate; and
(3) (meth)acrylated amines such as dialkylamino alkyl (meth)acrylates (e.g., diethylaminoethylacrylate) or N-morpholinoalkyl-(meth)acrylates (e.g., N-morpholinoethyl-acrylate).

In a preferred embodiment of the free radical curable inkjet ink, the polymerization synergist is an acrylated amine synergist.

Suitable amine synergists are commercially available as Omnipol™ ASA, Omnipol™ 894 nad Esacure™ A198 from IGM Resins.

Preferred commercial acrylated amine synergists include Photomer™ 4068, 4250, 4771, 4775, 4780, 4967 and 5006 from IGM Resins.

Colour Pigments

The colorant in the free radical curable inkjet ink is a colour pigment.

The colour pigments may be black, cyan, magenta, yellow, red, orange, violet, blue, green, brown, white, mixtures thereof, and the like. This colour pigment may be chosen from those disclosed by HERBST, Willy, et al. Industrial Organic Pigments, Production, Properties, Applications. 3rd edition. Wiley-VCH, 2004. ISBN 3527305769.

The colour pigments may be inorganic or organic, but for colours other than black or white, they are preferably organic colour pigments. The latter provide for a higher colour gamut than inorganic pigments.

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213. For colour gamut and light stability, most preferably pigments for a yellow inkjet ink are selected from the group consisting of C.I. Pigment Yellow 120, 139, 150, 151, 155, 180, 213 and mixed crystals thereof. The latter provide for good colour reproduction and light stability.

Particular preferred pigments are C.I. Pigment Red 17, 22, 23, 41, 48:1, 48:2, 49:1, 49:2, 52:1, 57:1, 88, 112, 122, 144, 146, 149, 170, 175, 176, 184, 185, 188, 202, 206, 207, 210, 216, 221, 248, 251, 254, 255, 264, 266, 270 and 272.

Particular preferred pigments are C.I. Pigment Violet 19, 23, 32, and 37.

For colour gamut and light stability, most preferably pigments for a magenta or red inkjet ink are selected from the group consisting of C.I. Pigment Violet 19, C.I. Pigment Red 122, 176, 202 and 254, as well as mixed crystals containing one of the foregoing. The latter provide for good colour reproduction and light stability.

Particular preferred pigments are C.I. Pigment Blue 15:1, 15:2, 15:3, 15:4, 15:6, 16, 56, 61 and (bridged) aluminium phthalocyanine pigments. For colour gamut and light stability, most preferably C.I. Pigment Blue 15:3, or 15:4 is selected. The latter provide for good light stability.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia Magenta RT-355-D from BASF AG.

Carbon black is preferred as a black pigment. Suitable black pigments include carbon blacks such as Pigment Black 7 (e.g. Carbon Black MA8® from MITSUBISHI CHEMICAL), Regal® 400R, Mogul® L, Elftex® 320 from CABOT Co., or Carbon Black FW18, Special Black 250, Special Black 350, Special Black 550, Printex® 25, Printex® 35, Printex® 55, Printex® 90, Printex® 150T from DEGUSSA. In a preferred embodiment, the carbon black pigment used is a pigment having less than 0.15% of toluene-extractable fraction using the method as described in section III, paragraph 5 of the Resolution AP (89) 1 dated 13 Sep. 1989 published by the Council of Europe.

It is also possible to make mixtures of pigments. For example, in a preferred embodiment a neutral black inkjet ink is used. Such a black inkjet ink is preferably obtained by mixing a black pigment and a colour pigment having an absorption maximum between 500 and 700 nm, such as a cyan and/or magenta pigment into the ink. A neutral black inkjet ink avoids the application of cyan or magenta inks for correcting the blackness, which leads to a thinner ink layer having an improved flexibility.

Pigment particles in inkjet ink should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 μm, more preferably between 0.070 and 0.300 μm and particularly preferably between 0.080 and 0.200 μm. Most preferably, the numeric average pigment particle size is no larger than 0.150 μm. An average particle size smaller than 0.050 μm is less desirable for decreased light-fastness, while an average particle size larger than 0.200 μm reduces the colour gamut.

The numeric average pigment particle size of pigment particles is best determined with a Brookhaven Instruments Particle Sizer BI90plus based upon the principle of dynamic light scattering. The ink is then diluted, for example, with ethyl acetate to a pigment concentration of 0.002 wt %. The measurement settings of the BI90plus are: 5 runs at 23° C., angle of 90°, wavelength of 635 nm and graphics=correction function.

The free radical curable inkjet ink may also include a white pigment as colorant, more preferably the white pigment is present in the free radical curable inkjet ink in an amount of at least 17.5 wt %, preferably 18.5 to 35.0 wt %, more preferably 19.5 to 33.0 wt % and most preferably 20.5 to 25.0 wt % based on the total weight of the free radical curable inkjet ink. In the above ranges, good opacity is obtained with thin white ink layers, while the viscosity does not increase too much so that jetting performance is not impaired. For this, a titanium dioxide pigment, such as rutile, is particularly preferred for the white pigment.

In a preferred embodiment, the polymerizable composition is between 50.0 and 70.0 wt %, preferably 60.0 to 68.0 wt % of the total weight of the free radical curable white inkjet ink.

In the case of a free radical curable white inkjet ink, preferably a pigment with a refractive index greater than 1.60, preferably greater than 2.00, more preferably greater than 2.50 and most preferably greater than 2.60 is used. The white pigments may be employed singly or in combination. Having the above refractive index, the dry thickness of the white ink layer can be minimized which is beneficial for flexibility.

Preferably titanium dioxide is used for the pigment with a refractive index greater than 1.60. Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high colouring power can reduce the total amount of titanium oxide, leading to improved storage stability and ejection performance of ink.

For surface treatment of the titanium oxide, an aqueous treatment or a gas phase treatment is applied, and an alumina-silica treating agent is usually employed. Untreated-, alumina treated- or alumina-silica treated-titanium oxide are employable. Alone or in addition to the previous surface treatments, an organic surface treatment may be used.

The numeric average particle diameter of the titanium oxide or other white pigments is preferably from 180 to 400 nm, more preferably from 200 to 330 nm, and most preferably from 220 to 300 nm. Sufficient hiding power cannot be obtained when the average diameter is less than 180 nm, and the storage ability and the jet-out suitability of the ink tend to be degraded when the average diameter exceeds 400 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvet containing 1.5 mL ethyl acetate and mixed until a homogenous sample was obtained. The measured particle size is the average value of 3 consecutive measurements consisting of 6 runs of 20 seconds.

Dispersants

Pigments are usually stabilized in the dispersion medium of polymerizable compounds by dispersing agents, such as polymeric dispersants or surfactants. However, the surface of the pigments can be modified to obtain so-called "self-dispersible" or "self-dispersing" pigments, i.e. pigments that are dispersible in the dispersion medium without dispersants.

In a preferred embodiment of the pigmented free radical curable inkjet ink, the pigment is stabilized by a polymeric dispersant.

The pigment is preferably used in a concentrated pigment dispersion for preparing inkjet inks in an amount of 10 to 40 wt %, more preferably of 15 to 30 wt % based on the total weight of the pigment dispersion. The concentrated pigment dispersion is then diluted into a free radical curable inkjet ink.

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

- statistically polymerized monomers (e.g. monomers A and B polymerized into ABBAABAB);
- alternating polymerized monomers (e.g. monomers A and B polymerized into ABABABAB);
- gradient (tapered) polymerized monomers (e.g. monomers A and B polymerized into AAABAABBABBB);
- block copolymers (e.g. monomers A and B polymerized into AAAAABBBBBB) wherein the block length of each of the blocks (2, 3, 4, 5 or even more) is important for the dispersion capability of the polymeric dispersant;
- graft copolymers (graft copolymers consist of a polymeric backbone with polymeric side chains attached to the backbone); and
- mixed forms of these polymers, e.g. blocky gradient copolymers.

The polymeric dispersant has preferably a number average molecular weight Mn between 500 and 30000, more preferably between 1500 and 10000. Larger molecular weight dispersants tend to increase the viscosity of the ink too much without adequately providing good dispersion stability.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

- DISPERBYK™ dispersants available from BYK CHEMIE GMBH;
- SOLSPERSE™ dispersants available from LUBRIZOL;
- TEGO™ DISPERS™ dispersants from EVONIK;
- EDAPLANT dispersants from MÜNZING CHEMIE;
- ETHACRYL™ dispersants from LYONDELL;
- GANEX™ dispersants from ISP;
- DISPEX™ and EFKAT dispersants from BASF;
- DISPONER™ dispersants from DEUCHEM.

Particularly preferred polymeric dispersants include Solsperse™ dispersants from LUBRIZOL, Efka™ dispersants from BASF and Disperbyk™ dispersants from BYK CHEMIE GMBH. Particularly preferred dispersants are Solsperse™ 32000, 35000 and 39000 dispersants from LUBRIZOL.

The polymeric dispersant is preferably used in an amount of 2 to 300 wt %, more preferably 10 to 100 wt %, most preferably 50 to 90 wt % based on the weight of the pigment. An amount between 2 and 90 wt % provides for a good dispersion stability in combination with minimal effect on the ink viscosity.

Dispersion Synergists

A dispersion synergist usually consists of an anionic part and a cationic part. The anionic part of the dispersion synergist exhibiting a certain molecular similarity with the colour pigment and the cationic part of the dispersion synergist consists of one or more protons and/or cations to compensate the charge of the anionic part of the dispersion synergist.

The dispersion synergist is preferably added in a smaller amount than the polymeric dispersant(s). The ratio of polymeric dispersant/dispersion synergist depends upon the pigment and should be determined experimentally. Typically, the ratio wt % polymeric dispersant/wt % dispersion synergist is selected between 2:1 to 100:1, preferably between 2:1 and 20:1.

Suitable dispersion synergists that are commercially available include Solsperse™ 5000 and Solsperse™ 22000 from LUBRIZOL.

Particular preferred pigments for the magenta ink used are a diketopyrrolopyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. Solsperse™ 5000 from LUBRIZOL is preferred. Suitable dispersion synergists for yellow inkjet inks include those disclosed in EP 1790697 A (AGFA GRAPHICS).

Polymerization Inhibitors

The free radical curable inkjet ink may contain a polymerization inhibitor to prevent undesired polymerization during transport or storage. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from BASF; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total free radical curable inkjet ink.

In a preferred embodiment, the polymerization inhibitor is a polymerizable inhibitor, preferably containing one or more acrylate groups for achieving good reactivity.

Surfactants

The free curable inkjet ink may contain at least one surfactant. The surfactant can be anionic, cationic, non-ionic, or zwitter-ionic and is preferably added in a total quantity less than 3 wt %, more preferably less than 2 wt %, and most preferably no more than 1 wt % based on the total weight of the free radical curable inkjet ink.

Preferred surfactants are selected from fluoro surfactants (such as fluorinated hydrocarbons) and silicone surfactants. The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK™ 333 and BYK™ UV3510 from BYK Chemie and Tego-glide™ 410 from EVONIK.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by Chisso Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc.

Preparation of Pigmented Free Radical Curable Inkjet Inks

Pigment dispersions may be prepared by precipitating or milling the pigment in the dispersion medium in the presence of the dispersant.

A method of manufacturing a free radical curable inkjet ink preferable includes the steps of a) milling a colour pigment in the presence of a polymeric dispersant and a polymerizable compound into a concentrated pigment dispersion; and b) diluting the concentrated pigment dispersion with polymerizable compounds and other additives so that a free radical curable inkjet ink is obtained with the correct viscosity and surface tension.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is preferably performed with cooling to prevent build up of heat, and as much as possible under light conditions in which actinic radiation has been substantially excluded.

The pigment dispersion may contain more than one pigment. Such a pigment dispersion may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier.

The milling time can vary widely and depends upon the pigment, the selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general, it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Natural Leather

The manufacturing of natural leather articles is well known and can generally be split up in five phases as shown by FIG. 1. The preparatory phase 1 often occurs partly in a slaughterhouse and partly in a tannery, while phases 2 to 4 occur in the tannery and phase 5 occurs at a leather article manufacturer. In a first phase, the preparatory phase, the skin is removed from the animal (flaying) and pre-treated for the second phase of tanning. The pre-treatment may involve processes such as soaking, liming, unhairing, splitting and pickling (adjusting pH for assisting penetration of tanning agents). In the tanning phase, the protein of the rawhide or skin is converted into a stable material that will not putrefy. Chrome is most frequently used as tanning agent whereby the tanned product obtains a pale blue colour, therefore commonly called "wet blue". In the third phase of crusting, the tanned leather is dried and softened. The crusting often includes processes such as stripping (removal of superficially fixed tannins), fat liquoring (fats, oils and waxes are fixed to the leather fibres), dyeing, whitening, physical softening, and buffing (abrasion of leather surface to reduce grain defects). In the fourth phase, called the finishing phase, the leather is made ready for sale to leather article manufacturers. Finishing operations may include lacquer coating, polishing and embossing. In the fifth phase, a leather article is manufactured, involving processes, which may include cutting, perforating, sewing, leather wrapping, decoration and embossing.

Natural leather comes in different grades (see FIG. 2), such as full grain (24), top grain (25) which is essentially full-grain but with part of the grain layer sanded and the underlying split layer removed, and split leather (26). For the latter, the underlying layer of the cowhide is removed and used to create split leather. Depending on the thickness of the underlying layer, many splits can be created. Split leather has a rough appearance and is usually used to make suede.

For preventing grain damage and weakness, the hide or skin is tanned preferably by chrome, but other tanning methods such as vegetable tanning may also be used. After tanning, the leather is dried and softened into so-called crusted leather. The crusting may include processes such as stripping (removal of superficially fixed tannins), fat liquoring (fats, oils and waxes are fixed to the leather fibres), dyeing, whitening, physical softening, and buffing (abrasion of leather surface to reduce grain defects).

In the present invention, a decorated leather is obtained by the above described manufacturing method. The decorated natural leather may be used for manufacturing a wide range of leather articles. Preferred leather articles include footwear, furniture, upholstery, bags and luggage, gloves, belts, wallets, clothing, automotive leather (e.g. train, plane, boat and car seats), interiors, books, stationary, interior decoration, packaging, equestrian articles, and the like.

Other Substrates

There is no limitation on the nature of the substrate whereon the pigmented free radical curable inkjet ink can be printed. However, the pigmented free radical curable inkjet ink can be printed is advantageously used on flexible substrates.

Another example of a flexible substrate requiring good flexibility and stickiness is a so-called backlit-film. Backlit film is a material upon which graphics or text is printed so that when light shines through from behind, the design lights up.

In a preferred embodiment, the substrate is a backlit film comprising a material selected from the group consisting of polyvinylchloride, polyethylene terephthalate (PET), polyethylene, polypropylene, polycarbonate, polyacrylate, polystyrene, nylon and polyvinylacetate.

The pigmented free radical curable inkjet ink according to the invention can also be advantageously used on tarpaulin.

A tarpaulin or tarp is a large flexible sheet of water-resistant material. In Australia, a tarp may be known as a hootch. Tarpaulins often have reinforced grommets at the corners and along the sides to form attachment points for rope, allowing them to be tied down or suspended. The latter is advantageously exploited for truck curtains in so-called tautliners.

Preferred tarpaulins are selected from the group consisting of woven polyethylene, canvas, polyester coated with polyurethane, vinyl tarpaulins and silnylon.

A particularly preferred tarpaulin is a vinyl tarpaulin carrying a cured layer of pigmented free radical curable inkjet inks in accordance with the present invention.

In a preferred embodiment, the tarpaulin has a thickness of at least 130 μm, preferably at least 180 μm, more preferably 230 μm to 600 μm. A thickness of 230 μm allows for heavy duty flexin Inkjet Printing Methods An inkjet printing method according to a preferred embodiment of the present invention includes the steps of:

a) jetting a pigmented free radical curable inkjet ink as described above on a substrate; and
b) curing the jetted pigmented free radical curable inkjet ink by UV LED sources having a spectral emission in the range of 360-420 nm.

The pigmented free radical curable inkjet inks of the present invention are advantageously used for UV curing by UV LED sources having a spectral emission in the range of 360-420 nm. These UV LED sources tend to cure the interior of ink layer much better than the surface of the ink layer, resulting in a sticky surface that is vulnerable for damage.

Manufacturing Methods for Decorating Natural Leather

A manufacturing method for decorating natural leather according to a preferred embodiment of the present invention includes the inkjet printing method as described above, wherein the pigmented free radical curable inkjet ink is jetted on a base coat present on a crusted leather surface to form a decorative image, optionally in combination with other pigmented free radical curable inkjet inks.

In a preferred embodiment of the manufacturing method for decorating natural leather, a protective topcoat is applied to the decorative image after curing the pigmented free radical curable inkjet ink.

Base Coats and Top Coats

The base coat is applied on the crust leather for providing a level of image quality commensurate to the luxury aspect of leather as otherwise the low viscosity of inkjet inks lets them penetrate rapidly into the leather resulting in a reduced image quality.

The base coat preferably has a colour similar to that of the corium and the grain. Any desired colour may be chosen for the corium or grain and the base coat, such as red, green, brown, black, blue. The corium and grain is usually dyed by dyes during the crusting phase (see Phase 3 in FIG. 1), while usually colour pigments are included in the base coat.

The base coat may be applied as a single layer, or may be applied as multiple layers. The multiple layers may even have a different composition for improving properties like adhesion or flexibility.

A top coat may be applied onto the decorative image and the base coat for enhancing the scratch resistance of the decorative image.

The top coat may be applied as a single layer, or may be applied as multiple layers. The multiple layers may even have a different composition for improving properties like scratch resistance.

The protective top coat may have the same or a similar composition as the base coat. Usually the protective top coat is somewhat optimized according to the leather application. For example, flexibility does not play an important role for a leather book cover contrary to leather shoes. Hence, the protective top coat for a book cover may be optimized towards scratch resistance.

The base coat and/or the top coat preferably includes a polymer or copolymer based on polyurethane, as this has been found to improve flexibility to the printed leather. The base coat and/or top coat preferably further includes a polyamide polymer or copolymer, as polyamide has been found to improve the compatibility with the crust leather and to improve the strength of the base coat.

Suitable polyurethanes include Urepal™ PU147 and PU181 from CHEMIPAL S.p.A.; Melio™ Promul 61 from STAHL; Astacin™ Finish PS from BASF; Ecrothan™ 4075, 4078 and 4084 from MICHELMAN; Incorez™ CS8073 and CS065-195 from INCOREZ. The dry weight of the polyurethane in the base coat or top coat is preferably in the range of 1 to 6 $g/m^2$.

Suitable polyamides include the PA emulsion types ED310 and 161148 CX from MICHELMAN. The dry weight of the polyamide in the base coat or top coat is preferably less than 7 $g/m^2$, more preferably less than 5 $g/m^2$.

Although polyurethanes and/or polyamides are preferred as the polymers for the base" coat, other polymers may be used preferably in combination with the polyurethanes and/or polyamides. Such polymers preferably have an elongation at break of more than 200%, more preferably 300%. The elongation at break is measured according to ISO527-2, for example, with a MTS Exceed™ testing apparatus from MTS Systems Corporation.

Another type of preferred polymers to be used in the base coat or top coat are polyacrylates. Polyacrylates provide good flexibility and stabilize pigment dispersions in the base coat.

In a preferred embodiment, the base coat and/or top coat preferably includes a polymer or copolymer based on polyurethane and polymer or copolymer based on a polyacrylate. Such a combination brings excellent flexibility even in the presence of pigments.

Preferred polyacrylates are Roda™ Base 5514 from TFL and Primal™ HPB980 from LANXESS. A suitable polymeric acrylate emulsion is Bioflex™ KGA from LMF Biokimica.

A cross-linker may be incorporated in the base coat and/or top coat to improve the strength and the adhesion to crust leather. Preferred cross-linkers include aldehyde based cross-linkers such as formaldehyde, melamine formaldehyde derivatives, urea formaldehyde resins, glyoxal and gluraraldehyde, epoxides, oxazolines, carbodiimides and isocyanates, isocyanates being particularly preferred. The dry weight of the cross-linker in the base coat and/or top coat is preferably less than 1.4 $g/m^2$, more preferably less than 1.0 $g/m^2$.

The base coat and/or top coat is preferably applied by spraying, but may be applied by any coating technique known, such as knife coating, extrusion coating, slide hopper coating and curtain coating.

The top coat is most preferably a transparent top coat, but may be a translucent top coat. By having a transparent top coat, the inkjet printed image is clearly visible through the top coat. By using a translucent top coat, a special aesthetic effect is created.

If a matt top surface is desired for the inkjet printed leather, a matting agent may be included. Any suitable matting may be used. Preferred matting agent include silica. A preferred commercially available example of a silica dispersion is Euderm™ SN2 from LANXESS.

Inkjet Printing Devices

The pigmented free radical curable inkjet inks may be jetted by one or more print heads ejecting small droplets of ink in a controlled manner through nozzles onto an ink-receiver surface, which is moving relative to the print head(s).

A preferred print head for an inkjet printing system in the present invention is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However, the inkjet printing method in the present invention is not restricted to piezoelectric inkjet printing. Other inkjet print heads can be used and include various types, such as a continuous type and thermal, electrostatic and acoustic drop on demand type.

A preferred piezoelectric print head is a so called push mode type piezoelectric print head, which has a rather large piezo-element capable of ejecting also more viscous inkjet ink droplets. Such a print head is available from RICOH as the GEN5s print head.

Another preferred piezoelectric print head is a so-called through-flow piezoelectric drop-on-demand print head. Such a print head is available from TOSHIBA TEC as the CF1ou print head. Through-flow print heads are preferred because they enhance the reliability of inkjet printing as the ink continuously flows through the print head.

An inkjet print head normally scans back and forth in a transversal direction across the moving ink-receiver surface. Sometimes the inkjet print head does not print on the way back, however bi-directional printing is preferred for obtaining a high areal throughput.

Another preferred inkjet device uses a "single pass printing process", which can be performed by using page wide inkjet print heads or multiple staggered inkjet print heads that cover the entire width of the substrate surface. In a single pass printing process, the inkjet print heads usually remain stationary and the substrate is transported under the inkjet print heads.

Curing Devices

The pigmented free radical curable inkjet inks of the present invention are cured by exposing them to actinic radiation, preferably to ultraviolet radiation. The actinic radiation may also originate from electron beam curing devices.

The pigmented free radical curable inkjet inks in the present invention can also be advantageously for electron beam curing, as the latter also cures the interior of a layer of a polymerizable composition better than the surface thereof. Furthermore, electron beam curing eliminates the need for photoinitiators, which is a financial benefit.

In inkjet printing, the curing means may be arranged in combination with the print head of the inkjet printer, travelling therewith so that the curable composition is exposed to curing radiation very shortly after been jetted, which is beneficial for image quality.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductive means such as a fiber optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing. UV radiation is generally classed as UV-A, UV-B, and UV-C as follows:

UV-A: 400 nm to 320 nm

UV-B: 320 nm to 290 nm

UV-C: 290 nm to 100 nm.

It is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

In a preferred embodiment of the method of inkjet printing according to the present invention, the inkjet printing device contains UV LEDs with a wavelength larger than 360 nm, preferably UV LEDs with a wavelength larger than 380 nm, and most preferably UV LEDs with a wavelength of about 395 nm.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as Aldrich Chemical Co. (Belgium) and Acros (Belgium) unless otherwise specified. Any water used was demineralized water.

PR122 is a quinacridone pigment available as PIGMENT RED 122 TCR 12203 IJ from TRUST CHEM EUROPE BV.

SYN is the dispersion synergist according to Formula (A):

Formula (A)

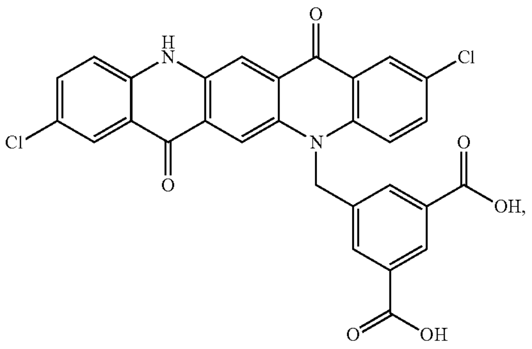

and was synthesized in the same manner as described in Example 1 of WO 2007/060254 (AGFA GRAPHICS) for the synergist QAD-3.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed.

PEA is 2-phenoxyethyl acrylate available as Sartomer™ SR339C from ARKEMA.

NVC is N-vinyl caprolactam available from BASF BELGIUM, NV.

V-MOX is a Vinyl methyl oxazolidinone (CAS No.: 3395-98-0) available as VMOX™ from BASF.

TBCH is 4-tert.butylcyclohexylacrylate available under the trade name of Sartomer CD217 from ARKEMA.

IDA is isodecyl acrylate available as Sartomer™ SR395 from ARKEMA.

G1122 is a monofunctional urethane acrylate having a $T_g$ of −3° C. and available as Genomer™ 1122 from RAHN having the Formula (B):

Formula (B)

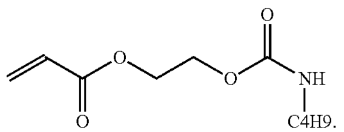

IBOA is isobornylacrylate (MW=208) available as Sartomer™ SR506D from ARKEMA.

PDA is polyethyleneglycol 400 diacrylate available as Sartomer™ SR344 from ARKEMA.

DPGDA is dipropylene glycol diacrylate available as Sartomer™ SR508 from ARKEMA.

HDDA is 1,6 hexanediol diacrylate available as Sartomer® SR238 from ARKEMA.

VEEA is 2-(2-vinyloxyethoxy)ethyl acrylate, a difunctional monomer available from Nippon Shokubai, Japan.

OLIGO is a urethane acrylate oligomer having two acrylate groups (MW=1900) available as Sartomer™ CN963B80 from ARKEMA.

INHIB is a mixture forming a polymerization inhibitor having a composition according to Table 1.

TABLE 1

| Component | wt % |
|---|---|
| DPGDA | 82.4 |
| p-methoxyphenol | 4.0 |
| BHT | 10.0 |
| Cupferron ™ AL | 3.6 |

Cupferron™ AL is aluminum N-nitrosophenylhydroxylamine from WAKO CHEMICALS LTD.

UV10 is 4-hydroxy-2,2,6,6-tetramethylpiperidinooxy sebacate available as Irgastab™ UV 10 from BASF.

TPL is ethyl phenyl(2,4,6-trimethylbenzoyl)phosphinate available as SpeedCure™ TPO-L from ARKEMA.

OTP is a polymeric acylphosphine oxide available as Omnipol™ TP from IGM Resins.

ITX is Darocur™ ITX is an isomeric mixture of 2- and 4-isopropyl thioxanthone from BASF.

T410 is a silicone surfactant available as Tegoglide™ 410 from EVONIK.

Measurement Methods

1. Average Particle Size

The particle size of pigment particles in a pigment dispersion was determined by photon correlation spectroscopy at a wavelength of 633 nm with a 4 mW HeNe laser on a diluted sample of the pigment dispersion. The particle size analyzer used was a Malvern™ nano-S available from Goffin-Meyvis.

The sample was prepared by addition of one drop of pigment dispersion to a cuvette containing 1.5 mL ethyl acetate and mixed until a homogenous sample was obtained. The measured particle size is the average value of 3 consecutive measurements consisting of 6 runs of 20 seconds.

2. Stickiness

The stickiness of a pigmented free radical curable inkjet ink was determined by printing in "Quality mode" a 13 cm×19 cm square at 100% ink coverage in 720×720 dpi resolution with an Anapurna™ 2050i LED from AGFA on a substrate. Samples were printed on a black coated leather from NUTI IVO S.p.A. as substrate and at two different UV curing modes (4 pass at 40% UV lamp power and 4 pass at 80% UV lamp power).

A printed sample is stapled with an unprinted MultiArt™ gloss substrate from PAPYRUS and kept in an oven for 24 hours under a steel plate with a weight of 4.85 kg at A° C. and B % relative humidity. Afterwards the amount of transfer of ink to the backside of the unprinted MultiArt™ gloss substrate is examined and given a score according to Table 2.

TABLE 2

| Score | Observation |
|---|---|
| 0 | No ink transfer visible |
| 1 | A very small amount of ink (some dots) is transferred to the backside of the unprinted substrate |
| 2 | Substantial ink transfer is clearly visible |
| 3 | Very large amounts of ink are transferred and some potential dots of coatings are attaching to the backside of the unprinted substrate |
| 4 | The printed sample is sticking to the backside of the unprinted substrate and needs some effort to be detached from the unprinted substrate |
| 5 | The printed sample is sticking to the backside of the unprinted substrate and is very difficult to detached |

The sum was made of the scores obtained for stickiness under the following conditions of temperature and % relative humidity of Table 3:

TABLE 3

| Printed sample (UV curing conditions) | A° C. | B % relative humidity |
|---|---|---|
| 4 pass at 40% UV lamp power | 20° C. | 90% |
| 4 pass at 80% UV lamp power | 20° C. | 90% |
| 4 pass at 40% UV lamp power | 25° C. | 95% |
| 4 pass at 80% UV lamp power | 25° C. | 95% |

The desired score for the above sum made of the scores obtained for stickiness is less than 4.0, preferably less than 3.0 and most preferably 0.0.

3. Flexing

The flexing of each pigmented free radical curable inkjet ink was determined by printing in "Quality mode" in 720×1440 dpi resolution with an Anapurna™ 2050i LED from AGFA on a red crusted leather from NUTI IVO S.p.A. having an Alussa® CB03 base coat from AGFA. Samples were printed at two different ink coverages (70% and 160%) and at two different UV curing modes (8 pass at 20% UV lamp power and 8 pass at 80% UV lamp power) resulting in four different samples for each inkjet ink.

The flexibility of a printed sample was determined on a SATRA™ STM 701 Bally flexometer wherein the printed samples had to endure the following numbers of dry flexing cycles: 500; 1000; 2500; 5000; 7500; and 20000 cycles. Photos were made after each of the above numbers of dry flexing cycles and then analyzed using Image-Pro® Analysis Software from Media Cybernetics. Scores are giving by judging the cracks on the photos according to the criterion shown in Table 4.

TABLE 4

| Score | Criterion |
|---|---|
| 0 | Bulk pieces of ink layer come completely off from the substrate. |
| 0.5 | Flexing zone completely peeling off in several parts or with small bulks (not continuous peeling off), long cracks peeling off. |
| 1 | A lot of cracks and long deep cracks with some regions/point peeling off. Holes of ink can be observed. |
| 1.5 | A lot of cracks starting to peel off in one or two regions or very long deep cracks on the flexing zone start to peel off. |
| 2 | Long deep cracks covering the flexing zone, where peeling off will happen. "Dry skin effect". |
| 2.5 | A lot of cracks plus one or two long cracks in the middle of the flexing zone. |
| 3 | One long and deep crack appears (minimum 1 cm) or several deep cracks so that you can see the color of the leather behind. |
| 3.5 | One long and line crack in the middle of the flexing zone or several line cracks (characterized as micro-cracks). You can see a bit the colour of the leather. |
| 4 | Only shallow or line cracks appear, leather beneath is invisible when you look at it out of the clamps. Really thin cracks where the colour of the leather can be seen. |

TABLE 4-continued

| Score | Criterion |
|---|---|
| 4.5 | Only micro cracks or small cracks. You cannot see the leather when the sample is out of the clamps. |
| 5 | Perfect |

An average was calculated for each inkjet ink from the result of each of the numbers of dry flexing cycles at the four different UV curing conditions (20% UV/70% ink coverage; 20% UV/160% ink coverage; 80% UV/70% ink coverage; 80% UV/160% ink coverage). For a good flexing result, the average score should be 4.0 or more.

4. Viscosity

The viscosity of the pigmented free radical curable inkjet inks was measured at 45° C. and at a shear rate of 1,000 $s^{-1}$ using a Rotovisco™ RV1 viscometer from HAAKE.

For reliable jetting, the viscosity should be between 5.0 and 12.0 mPa·s, preferably between 6.0 and 10.0 mPa·s 5. Static Surface Tension The static surface tension of the pigmented free radical curable inkjet inks was measured with a KRÜSS tensiometer K9 from KRÜSS GmbH, Germany at 25° C. after 60 seconds.

Example 1

This example illustrates the improved stickiness and flexing obtained with pigmented free radical curable inkjet inks according to the invention on natural leather while curing by UV LED sources having a spectral emission in the range of 360-420 nm.

Preparation of Magenta Pigment Dispersion CPM

A concentrated pigment dispersion CPM was prepared by mixing its components according to Table 5 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads from TOSOH. The mixture was circulated over the mill for 2 hours. After milling, the concentrated pigment dispersion was discharged over a 1 μm filter into a vessel. The concentrated pigment dispersion CPM had an average particle of 127 nm.

TABLE 5

| wt % of: | CPM |
|---|---|
| PR122 | 20.0 |
| SYN | 1.0 |
| DB162 | 10.0 |
| INHIB | 1.0 |
| PEA | 68.0 |

Preparation of Magenta Inkjet Inks

The above prepared concentrated pigment dispersion CPM was used to prepare the comparative free radical curable inkjet inks COMP-1 to COMP-13 according to Table 6 and Table 7 and the inventive free radical curable inkjet inks INV-1 to INV-7 according to Table 8.

TABLE 6

| wt % of: | COMP-1 | COMP-2 | COMP-3 | COMP-4 | COMP-5 | COMP-6 | COMP-7 | COMP-8 |
|---|---|---|---|---|---|---|---|---|
| PR122 | 3.50 | 3.50 | 3.50 | 3.50 | 3.50 | 3.50 | 3.50 | 3.50 |
| SYN | 0.175 | 0.175 | 0.175 | 0.175 | 0.175 | 0.175 | 0.175 | 0.18 |
| D162 | 1.75 | 1.75 | 1.75 | 1.75 | 1.75 | 1.75 | 1.75 | 1.75 |
| PEA | 44.92 | 44.92 | 56.78 | 26.42 | 39.92 | 46.92 | 47.42 | 46.42 |
| G1122 | 8.00 | 8.00 | 5.00 | 16.00 | 8.00 | 5.00 | 6.00 | 10.00 |
| IDA | 11.50 | 9.50 | 4.00 | 18.00 | 11.50 | 7.00 | 9.00 | 10.00 |
| TBCH | 8.00 | 10.00 | 8.34 | 0.00 | 11.00 | 13.50 | 0.00 | 8.00 |
| V-MOX | 10.00 | 10.00 | 12.00 | 22.00 | 12.00 | 10.00 | 20.00 | 10.00 |
| PDA | 0.00 | 0.00 | 0.00 | 0.00 | 0.00 | 0.00 | 0.00 | 3.00 |
| OLIGO | 5.00 | 5.00 | 1.30 | 5.00 | 5.00 | 5.00 | 5.00 | |
| ITX | 0.50 | 0.50 | 0.50 | 0.50 | 0.50 | 0.50 | 0.50 | 0.50 |
| TPL | 3.00 | 3.00 | 3.00 | 3.00 | 3.00 | 3.00 | 3.00 | 3.00 |
| OTP | 2.00 | 2.00 | 2.00 | 2.00 | 2.00 | 2.00 | 2.00 | 2.00 |
| T410 | 0.30 | 0.30 | 0.30 | 0.30 | 0.30 | 0.30 | 0.30 | 0.30 |
| UV10 | 0.35 | 0.35 | 0.35 | 0.35 | 0.35 | 0.35 | 0.35 | 0.35 |
| INHIB | 1.00 | 1.00 | 1.00 | 1.00 | 1.00 | 1.00 | 1.00 | 1.00 |

TABLE 7

| wt % of: | COMP-9 | COMP-10 | COMP-11 | COMP-12 | COMP-13 |
|---|---|---|---|---|---|
| PR122 | 3.50 | 3.50 | 3.50 | 3.50 | 3.33 |
| SYN | 0.18 | 0.18 | 0.18 | 0.175 | 0.10 |
| D162 | 1.75 | 1.75 | 1.75 | 1.75 | 1.75 |
| PEA | 37.92 | 36.90 | 26.90 | 46.42 | 48.21 |
| VEEA | | | | | 1.65 |
| HDDA | 4.00 | | | 2.00 | |
| G1122 | 8.00 | 14.5 | 14.5 | 8.00 | |
| IDA | 10.00 | 5.00 | 10.00 | 7.00 | 7.32 |
| TBCH | 10.00 | 23.52 | 23.52 | 13.00 | 3.30 |
| IBOA | | | | | 2.18 |
| NVC | | | | | 22.00 |
| V-MOX | 10.00 | 0.00 | 5.00 | 5.00 | 0.00 |
| PDA | 6.00 | 6 | 6 | 6.00 | 3.00 |
| OLIGO | 1.50 | 1.5 | 1.5 | | |
| ITX | 0.50 | 0.50 | 0.50 | 0.50 | 0.50 |
| TPL | 3.00 | 3.00 | 3.00 | 3.00 | 3.00 |
| OTP | 2.00 | 2.00 | 2.00 | 2.00 | 2.00 |
| T410 | 0.30 | 0.30 | 0.30 | 0.30 | 0.30 |
| UV10 | 0.35 | 0.35 | 0.35 | 0.35 | 0.35 |
| INHIB | 1.00 | 1.00 | 1.00 | 1.00 | 1.00 |

TABLE 8

| wt % of: | INV-1 | INV-2 | INV-3 | INV-4 | INV-5 | INV-6 | INV-7 |
|---|---|---|---|---|---|---|---|
| PR122 | 3.50 | 3.50 | 3.50 | 3.50 | 3.50 | 3.50 | 3.50 |
| SYN | 0.175 | 0.175 | 0.18 | 0.18 | 0.18 | 0.18 | 0.175 |
| D162 | 1.75 | 1.75 | 1.75 | 1.75 | 1.75 | 1.75 | 1.75 |
| PEA | 41.92 | 37.92 | 29.42 | 34.42 | 35.92 | 41.92 | 31.92 |
| G1122 | 8.00 | 12.00 | 8.00 | 8.00 | 8.00 | 8.00 | 8.00 |
| IDA | 10.00 | 14.00 | 10.00 | 10.00 | 10.00 | 10.00 | |
| TBCH | 10.00 | 0.00 | 9.00 | 9.00 | 10.00 | 10.00 | 9.00 |
| V-MOX | 10.00 | 19.00 | 11.00 | 11.00 | 10.50 | 10.00 | 8.50 |
| PDA | 6.00 | 3.00 | 20.00 | 15.00 | 13.00 | 6.00 | 30.00 |
| OLIGO | 1.50 | 1.50 | | | | 1.50 | |
| ITX | 0.50 | 0.50 | 0.50 | 0.50 | 0.50 | 0.50 | 0.50 |
| TPL | 3.00 | 3.00 | 3.00 | 3.00 | 3.00 | 3.00 | 3.00 |
| OTP | 2.00 | 2.00 | 2.00 | 2.00 | 2.00 | 2.00 | 2.00 |
| T410 | 0.30 | 0.30 | 0.30 | 0.30 | 0.30 | 0.30 | 0.30 |
| UV10 | 0.35 | 0.35 | 0.35 | 0.35 | 0.35 | 0.35 | 0.35 |
| INHIB | 1.00 | 1.00 | 1.00 | 1.00 | 1.00 | 1.00 | 1.00 |

Results and Evaluation

The stickiness, flexing and viscosity of each pigmented free radical curable inkjet ink was determined according to the measurement method described above. The results are shown in Table 9. In this table the headings having the following meaning:

- wt % VMOX=the wt % of N-vinyl methyl oxazolidinone based on the total weight of the UV curable inkjet ink;
- wt % PDA=the wt % of a polyethyleneglycol diacrylate based on the total weight of the UV curable inkjet ink
- % Mono on ink=the wt % of monofunctional polymerizable compounds based on the total weight of the polymerizable composition;
- % PDA=the wt % of the polyethyleneglycol diacrylate based on the total weight of the polyfunctional polymerizable compounds;
- DBD=the double bond density DBD of the polymerizable composition. in mmol double bonds/g; and
- Ink Tg=de glass transition temperature of the free radical curable inkjet ink as calculated according Formula (I).

The surface tension is not shown in Table 9, but all inkjet inks were found to have a static surface tension between 20 and 23 mN/m at 25° C.

TABLE 9

| Sample of Ink: | wt % VMOX | wt % PDA | % Mono on ink | % PDA on Poly | DBD | Ink Tg | Stickiness | Flexing | Visco (mPa · s) |
|---|---|---|---|---|---|---|---|---|---|
| COMP-1 | 10.00 | 0.00 | 93.4% | 0% | 5.15 | 10.2 | 6.0 | 4.9 | 7.3 |
| COMP-2 | 10.00 | 0.00 | 93.4% | 0% | 5.15 | 13.0 | 5.0 | 4.6 | 7.5 |
| COMP-3 | 12.00 | 0.00 | 97.6% | 0% | 5.44 | 18.0 | 14.0 | 4.1 | 7.3 |
| COMP-4 | 22.00 | 0.00 | 93.4% | 0% | 5.46 | 11.8 | 2.0 | 3.9 | 8.0 |
| COMP-5 | 12.00 | 0.00 | 93.4% | 0% | 5.19 | 13.5 | 5.0 | 3.9 | 8.1 |
| COMP-6 | 10.00 | 0.00 | 93.4% | 0% | 5.16 | 17.5 | 5.0 | 3.9 | 6.8 |
| COMP-7 | 20.00 | 0.00 | 93.4% | 0% | 5.51 | 20.0 | 0.0 | 3.4 | 7.1 |
| COMP-8 | 10.00 | 3.00 | 95.7% | 100% | 5.34 | 9.3 | 11.0 | 3.1 | 6.1 |
| COMP-9 | 10.00 | 6.00 | 86.0% | 52% | 5.39 | 11.9 | 0.0 | 2.9 | 7.3 |
| COMP-10 | 0.00 | 6.00 | 91% | 80% | 4.84 | 10.1 | 8.0 | 4.7 | 8.2 |
| COMP-11 | 5.00 | 6.00 | 90.6% | 80% | 4.96 | 10.2 | 6.0 | 3.4 | 8.8 |
| COMP-12 | 5.00 | 6.00 | 90.0% | 75% | 5.23 | 9.2 | 5.0 | 3.3 | 7.7 |
| COMP-13 | 0.00 | 3.00 | 93.1% | 100% | 5.59 | 32.8 | 3.0 | 2.7 | 7.4 |
| INV-1 | 10.00 | 6.00 | 90.6% | 80% | 5.22 | 10.2 | 0.0 | 4.6 | 7.1 |
| INV-2 | 19.00 | 3.00 | 94.0% | 67% | 5.54 | 10.8 | 3.0 | 4.6 | 6.4 |
| INV-3 | 11.00 | 20.00 | 76.4% | 100% | 5.13 | 9.5 | 0.0 | 4.9 | 8.9 |
| INV-4 | 11.00 | 15.00 | 82.1% | 100% | 5.20 | 9.7 | 0.0 | 4.3 | 8.0 |
| INV-5 | 10.50 | 13.00 | 84.3% | 100% | 5.21 | 9.6 | 0.0 | 4.2 | 8.0 |
| INV-6 | 10.00 | 6.00 | 90.6% | 80% | 5.22 | 10.2 | 3.0 | 4.0 | 7.2 |
| INV-7 | 8.50 | 30.00 | 65.1% | 100% | 4.93 | 10.2 | 0.0 | 5.0 | 11.6 |

From the results in Table 9, it should be clear that only the inventive pigmented free radical curable inkjet inks INV-1 to INV-7 are capable of achieving the desired properties for both stickiness and flexing.

REFERENCE SIGNS LIST

Figure 2:
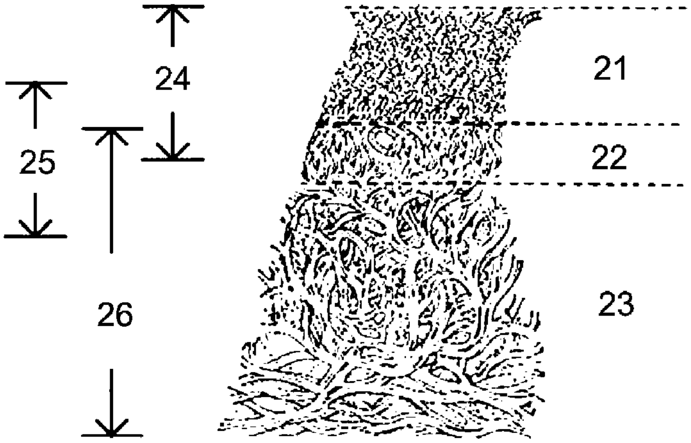
FIG. 2 shows schematically a cross-section of an animal skin including a grain (21) and a corium (23) separated by a junction of grain and corium (22). The different leathers made from the animal skin include full grain leather (24), top grain leather (25) and split leather (26).

The reference signs used in FIG. 2 are shown in Table 10.

TABLE 10

| | |
|---|---|
| 21 | Grain |
| 22 | Junction of grain and corium |
| 23 | Corium |
| 24 | Full grain leather |
| 25 | Top grain leather |
| 26 | Split leather |

The invention claimed is:

1. A pigmented free radical curable inkjet ink for manufacturing decorated natural leather including a polymerizable composition comprising monofunctional and polyfunctional polymerizable compounds which satisfies requirements (A) to (F):

(A) 65.0 to 95.0 wt % of monofunctional polymerizable compounds based on the total weight of the polymerizable composition;

(B) the polymerizable composition comprises a monofunctional acrylate;

(C) 8.0 to 25.0 wt % of a N-vinyl oxazolidinone according to the Formula 1 based on the total weight of the free radical curable inkjet ink, wherein the N-vinyl oxazolidinone according to the Formula 1 is:

Formula 1

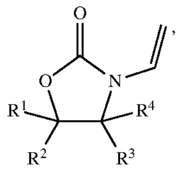

wherein R1 to R4 are each independently selected from hydrogen, alkyl, cycloalkyl, aryl, and combinations thereof, any of which may be interrupted by heteroatoms;

(D) 3.0 to 30.0 wt % of a polyethyleneglycol diacrylate based on the total weight of the free radical curable inkjet ink;

(E) the polyethyleneglycol diacrylate has a molecular weight MW between 350 and 750; and (F) the polyfunctional polymerizable compounds contain the polyethyleneglycol diacrylate in an amount of 60 to 100 wt % based on the total weight of the polyfunctional polymerizable compounds.

2. The pigmented free radical curable inkjet ink of claim 1, wherein the polymerizable composition has a double bond density DBD in the range of 5.12 to 5.60 mmol double bonds/g, wherein the double bond density DBD is calculated by the formula:

$$DBD = \frac{\sum_{i=1\ to\ n}^{n} \frac{F(i) \times \text{wt } \%\ (i)}{MW(i)}}{\sum_{i=1\ to\ n}^{n} \text{wt } \%\ (i)},$$

wherein i represents an integer of 1 to n;

n represents the number of polymerizable compounds in the free radical curable inkjet ink;

F(i) represents the functionality of polymerizable compound i;

MW(i) represents the molecular weight of polymerizable compound i; and wt % (i) is the weight percentage of polymerizable compound i based on the total weight of the pigmented free radical curable inkjet ink.

3. The pigmented free radical curable inkjet ink of claim 1, wherein the polyethyleneglycol diacrylate has a molecular weight MW between 400 and 600 and/or the N-vinyl oxazolidinone according to the Formula 1 is N-vinyl-5-methyl-2-oxazolidinone.

4. The pigmented free radical curable inkjet ink of claim 1, further comprising an acylphosphine oxide photoinitiator.

5. The pigmented free radical curable inkjet ink of claim 4, wherein the photoinitiator comprises ethyl phenyl (2,4,6-trimethylbenzoyl) phosphinate.

6. The pigmented free radical curable inkjet ink of claim 1, wherein the Ink Tg is calculated to be less than 18° C., with Ink Tg being calculated according to Formula (I):

$$InkTg = \frac{\sum_{i=1\ to\ n}^{n} \text{wt } \%\ PC(i)}{\sum_{i=1}^{n} \frac{\text{wt } \%\ PC(i)}{273.15 + TgPC(i)}} - 273.15, \qquad \text{Formula (I)}$$

wherein i and n are integers; n is the total number of polymerizable compounds in the free radical curable inkjet ink; TgPC(i) is the glass transition temperature in degrees Celsius of the polymerizable compound PC(i); and wt % PC(i) is the weight percentage of the polymerizable compound PC(i); and wherein all the weight percentages are based on the total weight of the free radical curable inkjet ink.

7. The pigmented free radical curable inkjet ink of claim 1, wherein the monofunctional acrylate includes 20.0 wt % to 33.0 wt % of phenoxyethyl acrylate based on the total weight of the pigmented free radical curable inkjet ink.

8. The pigmented free radical curable inkjet ink of claim 1, containing 70.0 to 93.0 wt % of monofunctional polymerizable compounds based on the total weight of the polymerizable composition.

9. The pigmented free radical curable inkjet ink of claim 1, wherein the polyfunctional polymerizable compounds contain the polyethyleneglycol diacrylate in an amount of 65 to 100 wt % based on the total weight of the polyfunctional polymerizable compounds.

10. A free radical curable inkjet ink set including at least three pigmented free radical curable inkjet inks as claimed in claim 1.

11. The free radical curable inkjet ink of claim 10, comprising:

a) a cyan pigmented free radical curable inkjet ink containing a beta-copper phthalocyanine pigment;

b) a magenta or red pigmented free radical curable inkjet ink containing a quinacridone pigment, a diketopyrrolopyrrole pigment or mixed crystals thereof;

c) a yellow pigmented free radical curable inkjet ink containing a yellow pigment selected from the group consisting of C.I. Pigment Yellow 83, C.I. Pigment Yellow 93, C.I. Pigment Yellow 97, C.I. Pigment Yellow 110, C.I. Pigment Yellow 120, C.I. Pigment Yellow 138, C.I. Pigment Yellow 150, C.I. Pigment Yellow 151, C.I. Pigment Yellow 154, C.I. Pigment Yellow 155, C.I. Pigment Yellow 175, C.I. Pigment Yellow 180, C.I. Pigment Yellow 181, C.I. Pigment Yellow 185, C.I. Pigment Yellow 194, C.I. Pigment Yellow 213, C.I. Pigment Yellow 214, and mixed crystals thereof; and d) a black pigmented free radical curable inkjet ink containing a carbon black pigment.

12. An inkjet printing method including the steps of:

a) jetting a pigmented free radical curable inkjet ink as claimed in claim 1 on a substrate; and b) curing the jetted pigmented free radical curable inkjet ink by UV LED sources having a spectral emission in the range of 360-420 nm.

13. The inkjet printing method of claim 12, wherein the substrate is a backlit film comprising a material selected from the group consisting of polyvinylchloride, polyethylene terephthalate (PET), polyethylene, polypropylene, polycarbonate, polyacrylate, polystyrene, nylon, and polyvinylacetate.

14. The inkjet printing method of claim 12, wherein the substrate is a tarpaulin.

15. The inkjet printing method of claim 12, wherein the substrate is a vinyl tarpaulin.

16. A manufacturing method for decorating natural leather including the inkjet printing method as claimed in claim 12, wherein the pigmented free radical curable inkjet ink is jetted on a base coat present on a crusted leather surface to form a decorative image, optionally in combination with other pigmented free radical curable inkjet inks.

* * * * *